United States Patent [19]

Hayashi et al.

[11] 4,192,839
[45] Mar. 11, 1980

[54] PROCESS FOR PRODUCING EXPANDED ARTICLE OF THERMOPLASTIC RESIN

[75] Inventors: Motoshige Hayashi; Toshiro Kobayashi, both of Nara, Japan

[73] Assignee: Sekisui Kaseihin Kogyo Kabushiki Kaisha, Osaka, Japan

[21] Appl. No.: 866,225

[22] Filed: Jan. 3, 1978

[51] Int. Cl.² ............................................. B29D 27/00
[52] U.S. Cl. .................................. 264/45.5; 264/46.1; 264/DIG. 14
[58] Field of Search .................. 264/51, 45.5, 46.1, 264/45.9, DIG. 14

[56] References Cited

U.S. PATENT DOCUMENTS

| 3,720,572 | 3/1973 | Soda et al. | 264/51 X |
| 3,993,721 | 11/1976 | Soda et al. | 264/45.5 |

*Primary Examiner*—Philip Anderson
*Attorney, Agent, or Firm*—Armstrong, Nikaido, Marmelstein & Kubovcik

[57] ABSTRACT

A process for producing an expanded article of a thermoplastic resin by extruding and expanding a foamable resin using an extruder equipped, on a resin channel in a die, with a nozzle having a number of apertures, which comprises flowing a resin mixture stream through an expansion zone while maintaining the resin mixture at a temperature above the melting point thereof, dividing the resin mixture stream into a plurality of separate streams, exiting these streams from the extrusion zone directly into a confined zone, thereby forming a plurality of soft expanded resin strands corresponding in number to the number of strands, bringing the strands into surface contact with each other to fuse and bond them together to form a bonded expanded resin mass while simultaneously removing gases generated in the course of extrusion and expansion, passing the bonded mass into an unconfined zone to permit the mass to further expand while still in a softened condition, passing the further expanded mass into a confined receiving zone of a smaller cross-sectional area than the further expanded mass, and cooling the mass to form an expanded article.

8 Claims, 11 Drawing Figures

PROCESS FOR PRODUCING EXPANDED ARTICLE OF THERMOPLASTIC RESIN

BACKGROUND OF THE INVENTION

1. Field of the Invention

This invention relates to a process for producing an expanded article of a crystalline thermoplastic resin. More particularly, this invention relates to a process for producing an expanded article of (1) a polypropylene resin, a polypropylene copolymer resin or a mixture of a polypropylene resin and less than about 50% by weight of an additional thermoplastic resin, or (2) a polyamide resin, which has excellent chemical and heat resistance and toughness.

2. Description of the Prior Art

Processes for producing a thermoplastic resin foamed article for use as a synthetic wood with woodgrain pattern by extruding a molten foamable thermoplastic resin through a nozzle having a number of apertures to expand the resin have already been known as described in, for example, U.S. Pat. Nos. 3,720,572 and 3,993,721 and Japanese Patent Application (OPI) No. 59,969/76.

The processes for producing a thermoplastic resin foamed article are directed to the production of a foamed resin primarily comprising a polystyrene resin. Since a polystyrene resin has a good foamability, desired resin foamed articles can be produced continuously over a long period of time according to the above-described processes.

However, in applying the above conventional processes to crystalline thermoplastic resins other than polystyrene, e.g., polypropylene, a resin containing polypropylene as a major component or a polyamide, it is very difficult to continuously produce resin foamed articles having good quality. No process suitable for foaming such crystalline thermoplastic resins have thus far been practically available. That is, since polypropylene and polyamide resins are crystalline thermoplastic resins, their melt viscosity is sensitively temperature-dependent, and a viscosity suitable for their expansion is in a narrow temperature range close to a temperature at which the resins crystallize. Generally, it is extremely difficult to conduct extrusion and expansion while controlling the nozzle temperature within such a narrow temperature range. In extruding such resins using a nozzle having a number of apertures, the resin streams flow in some portions with difficulty and partially crystallize and solidify to prevent expansion. In addition, such adverse affects on uniform, stable extrusion in respective apertures make it difficult to produce a resin foamed article having high quality using crystalline thermoplastic resin.

It has been considered that such problems could be solved by controlling the temperature of the nozzle with a high degree of accuracy in order to avoid crystallization and solidification of the resin. In fact, however, it is technically difficult to control the nozzle temperature within a critical narrow range suitable for expansion in order to avoid crystallization, since extrusion molding involves many factors which may vary widely. For example, to equip a nozzle with a temperature-controlling mechanism as disclosed in Japanese Patent Application (OPI) No. 59,969/76 is not satisfactory for a polypropylene resin or a polyamide resin; the resin crystallizes in part of a number of apertures, which prevents stable extrusion of resin streams. In addition, when the resin is cooled through a frame adjacent to a nozzle having a projection in its center as described in U.S. Pat. No. 3,993,721, it is difficult to extrude polypropylene resin quantitatively in respective apertures of the nozzle because plugging partly occurs. Thus, stable production of a thermoplastic resin foamed article, such as a polypropylene resin foamed article or a mixture thereof or a polyamide resin foamed article, having good quality over a long time was found to be very difficult.

SUMMARY OF THE INVENTION

As a result of extensive investigations to solve the above-described technical problems associated with the conventional processes in the continuous production of a crystalline thermoplastic resin foamed article used, for example, as a synthetic wood with woodgrain pattern, it was found that desired resin foamed articles with woodgrain pattern can be stably and continuously produced by elevating the temperature of a nozzle having a number of apertures to a level higher than the melting point of the resin mixture used, reducing the temperature of a frame directly connected to the nozzle, simultaneously restricting a cross-sectional area at the exit of extrusion zone to a given size to thereby control expansion after extrusion through respective apertures of the nozzle, thereby forming a plurality of soft expanded resin strands corresponding in number to the number of strands, bringing the strands into surface contact with each other to fuse and bond them together to form a bonded expanded resin mass while simultaneously removing gases generated in the course of extrusion and expansion, passing the bonded mass into an unconfined zone to permit the mass to further expand while still in a softened condition, passing the further expanded mass into a confined receiving zone of a smaller cross-sectional area than the further expanded mass, and cooling the mass to form an expanded article.

BRIEF DESCRIPTION OF THE DRAWINGS

FIG. 2 is a vertical side sectional view of the nozzle and FIG. 3 is a part of back view of the nozzle;

FIG. 4 is a vertical side sectional view of the nozzle and FIG. 5 is a part of front view of the nozzle;

FIGS. 8 and 9 similarly show a further example of a nozzle in which FIG. 8 is a vertical side sectional view of the nozzle and FIG. 9 is a part of a front view of the nozzle; and FIGS. 10 and 11 similarly show a still further example of a nozzle in which FIG. 10 is a vertical side sectional view of the nozzle and FIG. 11 is a part of a front view of the nozzle.

In these Figures, "E" designates an extruder, "1" designates a temperature controller, "2" a die, "3" a nozzle, "31" a projection, "32" apertures, "33" a gas releasing groove, "4" and "4'" frames, "41" and "41'" channels for a cooling medium, "5" a receiving frame, "6" a plate, "7" a water bath, "71" rolls, "8" a surface-processing apparatus, "9" take-up rolls, and "100" designates a foamed article.

DETAILED DESCRIPTION OF THE INVENTION

The present invention provides a process for producing a foamed article of a thermoplastic resin, such as (1) a polypropylene resin, a polypropylene copolymer resin or a mixture of a polypropylene resin and less than about 50%, preferably 1 to 30%, by weight of a thermoplastic resin, or (2) a polyamide resin, by extruding and expanding the resin using an extruder equipped, on a resin channel in a die, with a nozzle having a number of apertures, which comprises flowing a resin mixture stream through an expansion zone while maintaining the resin mixture at a temperature above the melting point thereof (for example, up to about 20° C., preferably up to 10° C., above the melting point), dividing the resin mixture stream into a plurality of separate streams; the cross-sectional area occupied by these streams being from about 5 to about 30%, preferably 5 to 15%, of the cross-sectional area at the exit of the extrusion zone, exiting these streams from the extrusion zone directly into a confined zone maintained at a temperature at least about 30° C., preferably at a temperature in the range of 50° C. to 100° C., lower than the temperature of the resin streams prior to the exiting, thereby forming a plurality of soft expanded resin strands corresponding in number to the number of strands, bringing the strands into surface contact with each other to fuse and bond them together to form a bonded expanded resin mass while simultaneously removing gases generated in the course of extrusion and expansion, passing the bonded mass into an unconfined zone to permit the mass to further expand while still in a softened condition, passing the further expanded mass into a confined receiving zone of a smaller cross-sectional area than the further expanded mass, and cooling the mass to form an expanded article.

The process of the present invention will now be illustrated in greater detail by reference to the attached drawings.

Figure 1:
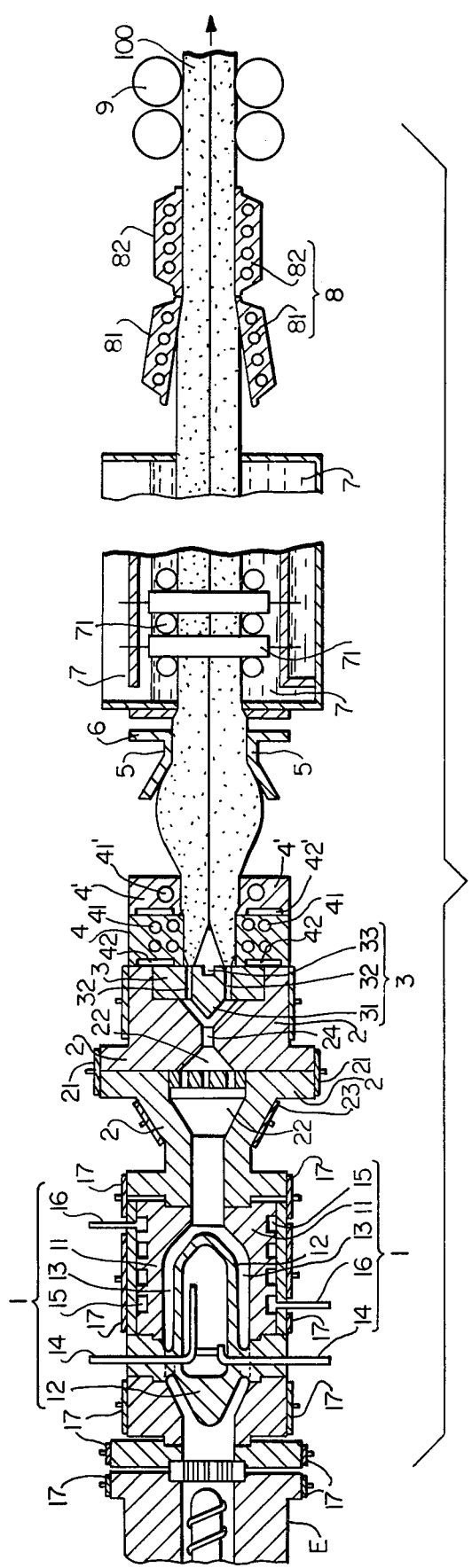
FIG. 1 is a part of a sectional view showing an embodiment of the process of the present invention.

FIG. 1 shows an embodiment of the present invention wherein temperature controller 1 is provided at the forward end of extruder E. Temperature controller 1 includes torpedo 12 in outer cylinder 11, and the space between them forms resin channel 13. A cavity is formed inside torpedo 12, and a heating or cooling medium is circulated in the cavity through pipe 14 to thereby heat or cool torpedo 12. Outer cylinder 11 has spiral channel 15 piercing therethrough, through which spiral channel a heating or cooling medium is circulated via pipes 16 to thereby heat or cool outer cylinder 11. Thus, a molten resin mixture flowing through channel 13 is controlled to a temperature with an extremely narrow range suitable for subsequent expansion. Band heaters 17 can be provided around outer cylinder 11.

Die 2 is provided subsequent to temperature controller 1. Band heater 21 is provided around this die 2, and resin channel 22 of die 2 is provided with resin stream-adjusting plate 23 having a number of openings and nozzle 3. Since the resin stream in resin channel 22 flows faster at the central portion than that of peripheral portion, diameters of the openings of resin stream-adjusting plate 23 are properly adjusted so that the resin stream becomes uniform. Resin channel 22 is provided with narrow neck 24 between resin stream-adjusting plate 23 and nozzle 3, which functions to avoid premature expansion and maintain expanding pressure.

Nozzle 3, having a number of apertures 32, 32, . . . arranged in two rows, has continuous projection 31 on a resin-entering side between these two rows. It also has gas-releasing groove 33 which is provided inward between the two rows of apertures 32, 32, . . . on the resin-exiting side. Further, square frame 4 having a plurality of channels 41 for controlling temperature is connected to the forward end of this nozzle 3 subsequent to die 2. The frame 4 is connected via space 42 having a heat-insulating effect in order to avoid direct transmission of heat from die 2. Still further, similar other frame 4' having an opening of slightly enlarged sectional area and having a plurality of similar channels 41' and similar space 42' is provided at the forward end of frame 4. Both ends of the above-described gas-releasing groove 33 are opened to atmosphere and gases generated after extrusion through respective apertures 32, 32, . . . are directly released into atmosphere. Numeral 5 designates a tapered receiving frame functioning to compress an expanded mass for reducing the sectional area within a given compression ratio. Numeral 6 designates a plate controlling the appearance and the dimension of the expanded mass. Numeral 7 designates a water bath for cooling and solidifying the expanded mass, and numeral 71 designates rolls provided in the water bath 7, which cools the mass while controlling its dimension. Surface-processing apparatus 8 is provided subsequent to water bath 7. This surface-processing apparatus 8 is constituted by heating and tapered compressing member 81 and subsequent cooling member 82, whereby the surface of the resin foamed article is reheated and compressed to such a degree that the sectional area of the foamed article is reduced by about 3% to about 20% as compared with the sectional area prior to the pre-heating and the compression to provide a hard surface layer and a high dimensional accuracy of the resulting shaped expanded article. Numeral 9 designates take-up rolls.

In the above-described production apparatus, the resin kneaded with, for example, nucleating agents, blowing agents and pigments, etc., and melted by means of heated extruder E, is controlled, by temperature controller 1, to a temperature slightly higher than the temperature suitable for expansion and also above the crystallization temperature of the resin mixture, and the resin stream is made uniform upon passing through resin stream-adjusting plate 23, then reaching nozzle 3. Subsequently, the resin stream is divided into a plurality of separate streams (two streams in FIG. 1) by projection 31 without causing dwelling of the resin mixture, and further separated through respective apertures 32, 32 . . . and finally extruded into frame 4, thereby forming a plurality of soft expanded resin strands corresponding in number to the number of strands. Gases generated at the exit of the nozzle 3 in the course of extrusion and expansion are directly removed by releasing into the atmosphere through gas-releasing groove 33 and never enter into the expanded mass. A plurality of soft expanded resin strands which have been extruded and expanded after being extruded through apertures 32, 32 . . . are cooled from the surface thereof by frame 4 adjusted to a suitable temperature for expansion which is lower than the temperature of nozzle 3, thus being successively expanded and fusion-bonded together in frame 4 to form a bonded expanded resin mass.

Then, the resulting bonded mass passed through frame 4 is further successively expanded and allowed to pass through receiving frame 5 reducing the sectional area of the resin mass and through plate 6, whereby apparent dimension is controlled and the bonded mass is more strongly fusion-bonded by compression, then directly cooled with water in water bath 7 while supporting the form by rolls 71. The thus obtained cooled expanded resin mass is, under heating, compressed by 3 to 20% and cooled by means of heated compressing member 81 and cooling member 82 to convert the surface to a hard surface layer with luster. Thus, there is obtained a shaped expanded article 100 with good dimensional accuracy and then taken up by rolls 9.

Figure 5:
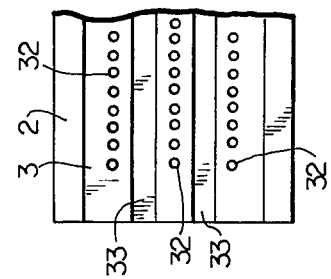
FIGS. 4 and 5 similarly show another example of a nozzle.
Figure 4:
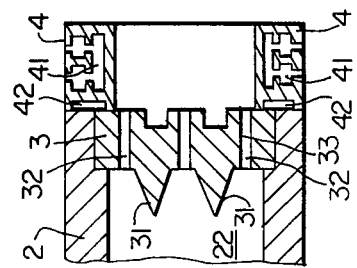
Figure 3:
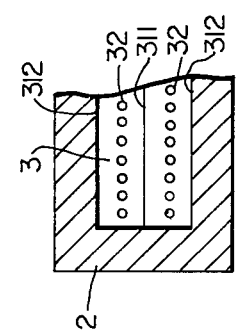
FIGS. 2 and 3 show an example of a nozzle which can be used in the extruder used in the present invention.
Figure 2:
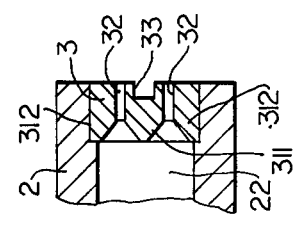

As the other example of nozzle 3 structure which can be used in the process of the present invention, FIGS. 2 and 3 show nozzle 3 which has horizontally continuing projection 311 between two rows of a number of apertures 32, 32 . . . spaced at an equal distance, and which has projections 312, 312 in contact with the upper or lower row of apertures 32, 32 . . . . Nozzle 3 is also provided with gas-releasing groove 33 in the same manner as nozzle 3 shown in FIG. 1. FIGS. 4 and 5 show another type of nozzle 3 which has two rows of horizontally continuing projections 31 on the resin-entering side, each of which projections 31 has on both sides thereof a number of apertures 32, 32 . . . spaced at an equal distance from each other (therefore, three rows in all).

Figure 6:
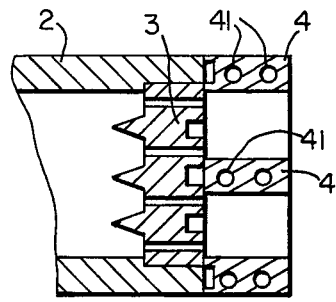
FIGS. 6 and 7 are vertical side sectional views showing other examples of frames used in the present invention.
Figure 7:
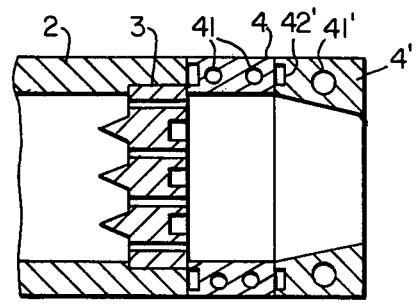

FIG. 6 shows still another type of nozzle 3 wherein screen 43 containing channel 41 is additionally provided in frame 4. FIG. 7 shows the structure wherein another square frame 4' having channel 41' is slightly narrowed along the way of extrusion and is provided at the forward end of squiare frame 4 via space 42'.

Figure 8:
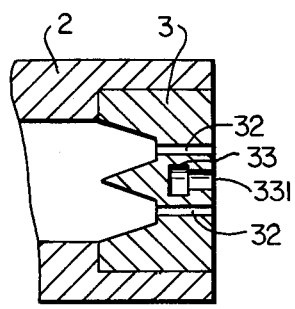
Figure 9:
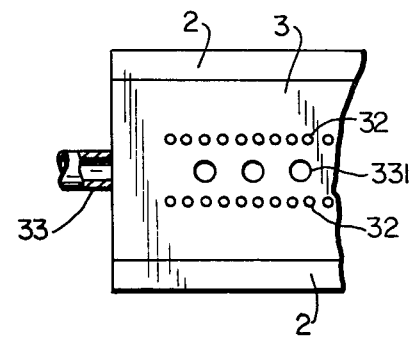

FIGS. 8 and 9 show the structure wherein gas-releasing groove 33 with both ends opening to the atmosphere is provided inside of nozzle 3, and gas-releasing holes 331 are provided at an equal distance from each other on the resin-leaving side between two rows of apertures 32, 32 . . . .

Figure 10:
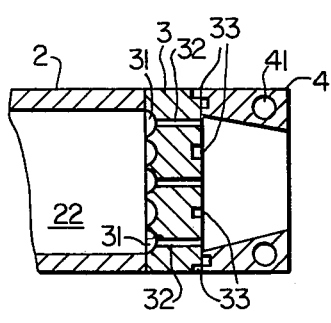
Figure 11:
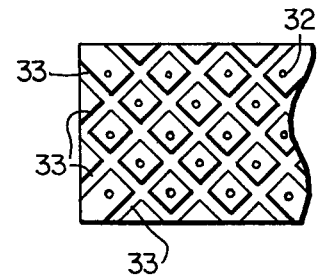

As a further example, FIGS. 10 and 11 show nozzle 3 wherein arc projections 31 are provided on the resin-entering side and a number of gas-releasing grooves 33, 33 . . . having both ends opening to the atmosphere are provided crossing at right angles to to each other, and to the forward end of which is connected square frame 4 which is narrowed along the way of extrusion.

Apertures 32 in nozzle 3 are 1 mm to 4 mm in diameter (with respect to round apertures), and are 10 mm to 30 mm in land length. They are spaced at a center distance of 2 mm to 20 mm from each other. They permit passage of the foamable resin mixture while setting the temperature of nozzle 3 to a temperature higher than the melting point of the resin mixture used. Projection 31 for preventing dwelling of the molten resin mixture on the resin-entering side is more effective in preventing dwelling of the resin mixture when the surface of the projection is subjected to a smoothing finish or to chromium plating or Teflon coating. It is necessary to provide a gas-releasing means on the outlet side of apertures in the nozzle in order not to prevent well bonding of resin streams with gases generated upon extrusion and expansion through respective apertures 32. For this purpose, there is provided a gas-releasing groove opened to the atmosphere on the outlet side of the nozzle.

Where wide or large moldings are formed, it is preferable to connect a suction pump to this gas-releasing groove for sucking generated gases.

The frame is provided for fusion-bonding a plurality of soft expanded resin strands which have been extruded through the nozzle and slightly expanded, and for cooling to a temperature suitable for expansion while restricting free expansion. Total cross-sectional area of resin channels of respective apertures must be set to about 5% to about 30%, preferably 5% to 15%, of the sectional area of resin channel in the frame. That is, if the sectional area of resin channel in the apertures is less than about 5%, contact of the strands with the inside surface of the frame would be so weak that the strands would be difficult to cool and become poor in foamability; whereas if the sectional area of the apertures is more than about 30%, gases released from the strands extruded at a higher temperature than the temperature suitable for expansion would not be completely removed through the gas-releasing groove and would remain between respective strands to form voids or gaps in the resulting article or, since respective strands cannot be fully expanded within the frame, cells would rather be extended in an extrusion direction than in a vertical direction to provide only a foamed article having weak compression strength.

In addition, the section of the resin channel in the frame may be enlarged or constricted in the direction of extrusion. That is, the cross-sectional area of the outlet of the frame may be enlarged or constricted by about 10% as compared with that of the inlet of the frame, and the length of the frame is preferably 30 mm to 100 mm. Where foamability is weak, this length is preferably prolonged. Also, the temperature of this frame must be adjusted to a lower temperature than that of the nozzle. It is effective to adjust the temperature of the frame lower than the melting point of the resin mixture by at least about 30° C., preferably by from 50° C. to 100° C. For this purpose, it is desirable to provide a plurality of channels in the frame and to circulate a cooling medium which has been adjusted to a desired temperature through the channels.

For example, in the event of using a polypropylene resin or a polypropylene resin having 1 to 30% by weight of another thermoplastic resin mixed therewith, the melting point of the resin mixture is about 150° to about 170° C., the temperature of the frame is controlled at about 50° to about 120° C., preferably 70° to 100° C. If the temperature of the frame is higher than about 120° C., resin strands are not fully expanded, or the resin adheres to an inner wall of the frame, or the cells rupture. On the other hand, when the temperature of the frame is less than about 50° C., a hard skin is formed on the surface of the resin strands in the frame and, thus, the resin strands are not fully expanded, and sometimes the resin solidifies in the nozzle due to the cooling of the frame.

The cross-sectional shape of the resin channel of receiving frame 5 is almost the same as that of the resin channel in frame 4, and it is preferable to reduce, by about 5% to about 50%, the section of the expanded mass having been expanded with an expansion ration of about 1.2 to about 2.5 upon extrusion through the frame into an unconfined zone. Receiving frame 5 can also be constituted by arranging rolls in parallel crosses. That is, the surface of the expanded mass extruded through frame 4 into an unconfined zone is uneven, and reduction by less than about 5% is not enough to smooth the surface, whereas reduction by about more than 50% causes too much resistance.

Thus, expanded resin strands are strongly fusion-bonded through constriction pressure in this occasion to provide a bonded mass having good dimensional accuracy, which can be used, for example, as a smooth surface synthetic wood with distinct woodgrain pattern.

Thus, by appropriately settling the shape of the channels for the resin, such as the nozzle, frame, receiving frame, etc., an expanded resin long article having a cross-section of, for example, plate type, square type, round type and complicated type, such as threshold or doorsill, can be obtained. Further, there can be obtained an expanded resin article having a high compression strength in which each strand within the expanded resin article forms a long rectangle or approximate triangle in the thickness direction.

Examples of resins which can be used in the process of the present invention are (1) a polypropylene resin, a polyproplyene copolymer resin, a mixture of polypropylene and less than about 50% by weight of a thermoplastic resin, or (2) a polyamide resin.

Polypropylene resins which can be used are preferably ones having a melt index of less than about 5 (measured according to ASTMD-1238, hereinafter the same).

Examples of polypropylene copolymer resins which can be used include an ethylene-propylene copolymer resin.

Examples of the thermoplastic resins which can be blended with a polypropylene resin are a polystyrene resin, preferably one having a melt index of less than about 15; a polymethyl methacrylate resin, preferably one having a melt index of less than about 5; a high density polyethylene resin, preferably one having a melt index of less than about 3; a polycarbonate resin; an acrylonitrile-styrene copolymer resin, preferably one having a melt index of less than about 7; a polyamide resin; and the like. These resins are blended usually in a proportion of 1% by weight to 30% by weight, preferably 2% by weight to 25% by weight, based on the total resin components. Blending polypropylene with these resins serves to improve foamability of the polypropylene resin and to provide a stable molding property; thus good resin foams are continuously produced. Of the above-described resins to be blended, a polystyrene resin, a polymethyl methacrylate resin and a high density polyethylene resin are particularly preferable.

Examples of polyamide resins which can be used alone are nylon 6, nylon 66, nylon 12 and the like. A particularly preferred example of polyamide resins is nylon 12.

In the present invention, various foaming agents can be used. Examples of foaming agents are easily volatile liquids of aliphatic hydrocarbons, such as pentate, butane, propane, petroleum ether, etc., or halogenated hydrocarbons such as monochloromethane, trichlorofluoromethane, dichlorotetrafluoroethane etc., and thermally decomposable foaming agents such as azodicarbonamide, dinitroscopentamethylenetetramine, etc. These foaming agents can be previously mixed with the resin to be fed to an extruder or can be poured into the extruder to mix upon extrusion. The amount of the foaming agent can vary widely depending upon the desired expansion ratio, but is usually about 1 to about 15% by weight based on the total amount of the resin composition.

In order to uniformly form fine cells in the resin, addition of a foaming aid or a nucleating agent in addition to the above-described foaming agent is desirable. Examples of such additives are fine powdery talc, silica powder, a mixture of sodium bicarbonate and citric acid, and the like, which are well known in the art.

The process of the present invention is constituted as described above and, since the expanded resin strands which have been extruded through apertures in the nozzle and once expanded are adjusted to a suitable temperature for expansion by means of the frame, it enables continuous production of further expanded mass with good quality. On the other hand, the temperature of the nozzle itself can be maintained at a comparatively high level. Hence, neither crystallization nor solidification occurs in the apertures of the nozzle, thus not causing change in the extrusion amount. This point also ensures stable extrusion production of a foamed article with good quality.

In addition, the present invention enables direct release into the atmosphere of gases generated in the course of extrusion and expansion, and enables production of a wide or large foamed article having no voids or gaps between a plurality of expanded resin strands due to the generated gases.

The thus obtained shaped expanded article is superior to polystyrene foams in heat resistance, chemical resistance and toughness without producing black smoke upon combustion. Hence, it can be suitably used as materials for a heating apparatus or a hot water-feeding equipment, or as structural materials for apparatus for producing industrial chemicals, packaging materials, wood fillers, press molding materials, etc.

The present invention will now be illustrated in greater detail by referring to the embodiment using the molding apparatus shown in FIG. 1. Unless otherwise indicated, all parts, percents, ratios and the like are by weight.

EXAMPLE 1

A mixture prepared by uniformly mixing 2 parts of fine powdery talc (as a nucleating agent) and 0.2 part of a brown pigment with 100 parts of polypropylene resin (NOBLEN MH-8, made by Mitsubishi Petrochemical Co., Ltd.) was charged into a hopper of extruder E, which was set to 200° to 250° C. in the feed portion and 150° to 170° C. in the forward end. The mixture and a foaming agent of butane added into the extruder on the way were uniformly kneaded in the extruder and transferred to the resin temperature controller. The mixture was transferred to nozzle 3, maintained at a temperature of 170° C. to 180° C. through resin stream adjusting plate 23 in die 2, and extruded into frame 4 and expanded on the outlet side of a number of apertures in nozzle 3. Then, a plurality of soft expanded resin strands extruded through respective apertures were fusion-bonded together in the above-described frame 4 controlled by circulating an oil of 85° to 90° C. and also circulating water of room temperature into frame 4' with the apparent shape maintained and, subsequently, the bonded expanded resin mass was once released into the atmosphere to further permit expansion to such degree that cross-sectional area thereof became 1.2 to 2.5 times greater than that of the opening of mold 4, then constricted by 5 to 50% in sectional area based on the sectional area of the secondary expanded resin mass by means of receiving frame 5. The thus constricted resin mass was cooled by passing through water bath 7, and surface-processed by surface-processing apparatus 8, followed by continuously drawing by take-up rolls 9. Thus, there was obtained foamed article 100 having luster, hard surface and woodgrain pattern wherein lines of juncture formed in a longitudinal direction between respective resin streams appeared as brown lines, thus providing synthetic wood-like appearance.

In this example, a nozzle of the structure shown in FIGS. 2 and 3 was used as nozzle 3. That is, at the forward end of die 2 was provided nozzle 3 having a rectangular cross-section of 22 mm in height and 152 mm in width and having 96 apertures of 1.6 mm in diameter in the center thereof aligned in parallel two rows with a vertical distance of 10 mm, with respective apertures in each row being spaced from each other at a horizontally equal distance of 3 mm. Outlet side of nozzle 3 was in a vertical form, and gas-releasing groove 33 of 6 mm in width and 5 mm in depth communicated to the atmosphere was provided between the upper and lower rows of apertures 32, 32 . . . . In addition, frames 4 and 4', which were connected to each other, had a section, in longitudinal direction, of 13 mm in height and 150 mm in width, had a length of 35 mm in parallel to the extrusion direction, and supplementally had an opening of 14×152 mm in cross-section and 35 mm in length; the inner surface of which was uniformly coated with Teflon. In addition, the frame contained channels 41 for circulating a temperature-controlling oil and channels 41' for circulating cooling water provided in upper and lower parts of the mold. In the further stage, receiving frame 5 with a cross-section of 13×150 mm, plate 6, and rolls 71 having an opening of rectangular cross-section in a longitudinal direction for controlling apparent dimension were provided, followed by a water bath for cooling the foamed resin mass with water, wherein the foamed resin mass was cooled while being supported and constricted by rolls 71. Then, the once-cooled resin foam was guided to surface-processing apparatus 8 comprising heating and compressing plates 81 and cooling plates 82 to reduce the sectional area of the resulting article by 3 to 20% to obtain smooth surface expanded article 100 having good surface luster, surface hardness and compression strength.

The expanded article 100 thus prepared was a plane plate of 12 mm in thickness and 150 mm in width having been expanded 7.3 times. The resulting plate had a cross-sectional structure comprising two parallel rows of fusion-bonded strands, each strand having a height of 6 mm and a width of 3 mm. They did not contain voids at the interface between fusion-bonded resin foam streams, and the surface thereof had straight lines of juncture between resin foam streams, which provided the appearance analogous to grains of natural woods. Thus, they appeared like natural woods coupled with the light-weight appearance thereof.

EXAMPLE 2

A mixture prepared by uniformly mixing 1 part of fine powdery talc and 2 parts of azodicarbonamide with 100 parts of polyamide resin (AMILAN X-5021 made by Toray Industries, Inc.) was fed into extruder E, which was set to 180° to 260° C. The mixture was extruded and expanded by nozzle 3 set to 160° to 170° C. The temperature of frame 4 was controlled at 100° to 110° C. by air passing through channels 41. The thus extruded foamable polyamide resin streams were expanded in frame 4 and passed successively through receiving frame 5, plate 6 and rolls 71 shown in FIG. 1 to thereby be fusion-bonded. Subsequently, the bonded expanded resin mass was water-cooled with water bath 7 and solidified to obtain desired article 100 comprising an expanded article of the polyamide resin.

The expanded article 100 thus prepared was a continuous plane plate of 18 mm in thickness and 30 mm in width and the density thereof was 0.4 to 0.5 g/cm³.

In this example, a nozzle of the structure shown in FIGS. 10 and 11 was used as nozzle 3. That is, at the forward end of die 2 was provided nozzle 3 having a rectangular cross-section of 24 mm×29 mm and having 39 aperture of 1.6 mm in diameter and of 10 mm in depth with respective apertures in each row being spaced from each other at a horizontally equal distance of 5 mm, as shown in FIG. 11. At the outlet side of nozzle 3 was provided gas-releasing grooves 33 of 1 mm in width and 3 mm in depth crossly. In addition, a frame of the structure shown in FIG. 7 was used as frame 4. That is, frame 4 had an orifice opening of 24 mm×29 mm at inlet and 18 mm×29 mm at outlet and of 20 mm in length, the inner surface of which frame being plated with chromium.

COMPARATIVE EXAMPLE

When the temperature of nozzle 3 in the foregoing Example 1 was set to 160° C., there was observed slight breakage in the streams of foamable resin in apertures 32, whereas when the temperature of nozzle 3 was set to 150° C., there was observed complete breakage due to crystallization of resin, resulting in unstable extrusion and preventing subsequent expansion. Thus, there was not obtained a uniformly expanded article with high expansion ratio.

In addition, when frame 4 was cooled with the temperature-controlling oil raised to 120° C., expansion of the foamable extruded resin streams did not start unless the temperature of nozzle 3 was lowered to less than 160° C. However, polypropylene resin used is liable to become crystalline at this temperature of nozzle 3, and gapped or broken inner portions are formed in the resulting article. Thus, there cannot be obtained satisfactory plane plates comprising polypropylene foam.

Next, the kind of resin and amount of butane to be used were changed and the resin temperature at the forward end of extruder E, the resin temperature at the inlet of nozzle 3 and the temperature of frame 4 were controlled as shown in the following table using the molding apparatus used in Example 1 to obtain similarly good resin foamed articles with good quality.

TABLE

| Polypropylene Resin | Parts by Weight | *1 | *2 | *3 | *4 | *5 | *6 | *7 |
|---|---|---|---|---|---|---|---|---|
| Polypropylene*8 | 100 | 11.0 | 173 | 165 | 13 × 150<br>14 × 152 | 35 80<br>35 | 12 × 150 | 7.3 |
| Talc | 2 | 9.8 | 177 | 167 | 13 × 150<br>14 × 152 | 35 80<br>35 | 12 × 150 | 4.5 |
| Pigment*9 | 0.2 | | | | | | | |
| Polypropylene*8 | 100 | 5.5 | 176 | 166 | 13 × 150 | 30 100 | 14 × 160 | 8.4 |
| Polystyrene*10 | 20 | | | | | | | |
| Talc | 2 | 6.5 | 189 | 178 | 13 × 150 | 30 100 | 14 × 160 | 7.0 |

TABLE-continued

| Polypropylene Resin | Parts by Weight | *1 | *2 | *3 | *4 | *5 | *6 | *7 |
|---|---|---|---|---|---|---|---|---|
| Polypropylene*8 | 100 | | | | | | | |
| Polystyrene*10 | 5 | 9.0 | 180 | 166 | 13 × 150 | 50 90 | 13 × 150 | 10.0 |
| Talc | 2 | | | | | | | |
| Polypropylene*8 | 100 | | | | | | | |
| Polymethyl*11 methacrylate | 20 | 8.3 | 189 | 178 | 13 × 150 | 50 90 | 13 × 150 | 8.0 |
| Talc | 2 | | | | | | | |
| Polypropylene*8 | 100 | | | | | | | |
| High Density*12 polyethylene | 20 | 8.3 | 174 | 169 | 13 × 150 | 50 85 | 13 × 150 | 8.2 |
| Talc | 2 | | | | | | | |
| Polypropylene*8 | 100 | | | | | | | |
| Polycarbonate*13 | 20 | 7.6 | 191 | 174 | 13 × 150 | 50 90 | 13 × 150 | 11.8 |
| Talc | 2 | | | | | | | |
| Ethylene-propylene*14 | 100 | | | | | | | |
| Acrylonitrile-*15 styrene | 20 | 8.3 | 187 | 169 | 13 × 150 | 50 85 | 13 × 150 | 6.5 |
| Talc | 2 | | | | | | | |
| Polypropylene*8 | 100 | | | | | | | |
| Polyamide*16 | 20 | 7.4 | 188 | 176 | 13 × 150 | 50 85 | 13 × 150 | 8.5 |
| Talc | 2 | | | | | | | |
| Ethylene-propylene*14 | 100 | | | | | | | |
| Talc | 2 | 10.0 | 172 | 164 | 13 × 150 | 35 78 | 12 × 150 | 5.0 |
| Pigment*9 | 0.2 | | | | | | | |

*1Amount of butane added, % by weight
*2Temperature of resin at the forward end of the Extruder, °C.
*3Temperature of resin at the inlet of nozzle, °C.
*4Structure of frame mold; cross-section, length(mm)
*5Temperature of oil circulated in the frame mold
*6Cross-sectional area of molding frame in mm
*7Expansion ratio
*8NOBLEN MH-8, made by Mitsubishi Petrochemi-al Co., Ltd., was used as a polypropylene resin, which has a melt index of 0.3 (ASTM D-1238), a heat distortion temperature of 120° to 130° C. (ASTM D-648), and a Vicat softening point of 145° to 150° C. (ASTM D-1525)
*9PPMSSC 46315(C), made by Dainichiseika Color & Chemicals Mfg., Co., Ltd. was used as a rouge type pigment
*10STYRON 666, made by Asahi Dow, Co., Ltd was used as a polystyrene resin, which has a melt index of 7.5 (ASTM D-1238), a heat-distortion temperature of 94° C. (JISK-6871), and a Vicat softening point of 97° C. (ASTM D-1525)
*11DELPET 70H, made by Asahi Kasei Kogyo K.K., was used as a polymethyl methacrylate resin, which has a melt index of 0.5 (ASTM D-1238), a heat distortion temperature of 92° C. (ASTM D-648), and a Vicat softening point of 120° C. (ASTMD-1525)
*12Hi-ZEX 7000F, made by Mitsui Petrochemical Ind., Co., Ltd., was used as a high density polyethylene resin, which has a melt index of 0.04 (ASTM D-1238), and a Vicat softening point of 124° C. (ASTM D-1525)
*13IUPILON S2000, made by Mitsubishi Edogawa Chemical Co., Ltd., was used as a polycarbonate resin, which has a heat-distortion temperature of 134° to 140° C. (ASTM D-648)
*14NOBLEN EC-9, made by Mitsubishi Petrochemical Co., Ltd. was used as an ethylene/propylene copolymer resin, whichhas an ethylene content of 10% by weight and has a melt index of 0.4 (ASTM D-1238)
*15TYRIL 783, made by Asahi Dow Co., Ltd., was used as an acrylonitrile/styrene copolymer resin, which has a meltindex of 3.5 (ASTM D-1238), a heat-distortion temperatureof 94° C. (JIS K-6871), and a Vicat softening point of112° C. (ASTM D-1525)
*16 AMILAN X-5021, made by Toray Industries, Inc., was used as a polyamide resin, which has a heat-distortion temperature of 52° C. (ASTM D-648)

While the invention has been described in detail and with reference to specific embodiments thereof, it will be apparent to one skilled in the art that various changes and modifications may be made therein without departing from the spirit and scope thereof.

What is claimed:

1. A process for producing an expanded article of a crystalline thermoplastic resin having a sensitively temperature-dependent melt viscosity by extruding and expanding a foamable resin mixture using an extruder equipped, on the forward end thereof with a die having a resin channel therein a nozzle having a plurality of apertures therein and a frame for expansion, which comprises conveying said foamable resin mixture stream through said resin channel while maintaining the resin mixture at a temperature above the melting point thereof, dividing the resin mixture stream into a plurality of substantially parallel separate streams in said nozzle, the cross-sectional area occupied by the streams at the entrance of the extrusion area being reduced to the extent that the cross-sectional area occupied by said streams is from about 5 to about 30% of the total cross-sectional area at the exit of the extrusion area, exiting said streams from said extrusion zone in a common plane perpendicular to the axes of the streams directly into a confined zone defined by said frame and maintained at a temperature at least about 30° C. lower than the temperature of the resin streams prior to the exiting, thereby forming a plurality of soft expanded resin strands corresponding in number to the number of strands, bringing the strands into surface contact with each other to fuse and bond them together to form a bonded expanded resin mass while simultaneously removing gases generated in the course of extrusion and expansion, passing the bonded mass into an unconfined zone to permit the mass to further expand while still in a softened condition, passing the further expanded mass into a confined receiving zone defined by a tapered receiving frame and of a smaller cross-sectional area than the further expanded mass, and cooling the mass to form an expanded article.

2. The process as claimed in claim 1 wherein said resin is (1) a polypropylene resin, a polypropylene copolymer resin or a mixture of a polypropylene resin and less than about 50% by weight of an additional thermoplastic resin, or (2) a polyamide resin.

3. The process as claimed in claim 2 wherein said polypropylene copolymer resin is a copolymer of propylene and ethylene.

4. The process as claimed in claim 2 wherein said mixture contains 1% to 30% by weight of said additional thermoplastic resin.

5. The process as claimed in claim 2 wherein said mixture contains 2% to 25% by weight of said additional thermoplastic resin.

6. The process as claimed in claim 2 wherein said additional thermoplastic resin is a polystyrene resin, a polymethyl methacrylate resin, a polyamide resin, a polycarbonate resin, an acrylonitrile-styrene copolymer resin or a high-density polyethylene resin.

7. The process as claimed in claim 1 wherein said confined receiving zone of a smaller cross-sectional area has a sectional area smaller than that of the further expanded mass by about 5% to about 50%.

8. The process as claimed in claim 1 wherein said expanded article is further passed through a heated compressing zone, thereby reducing the thickness of said expanded article by 3 to 20% and subsequently through a cooling zone to convert the surface to a hard surface layer with luster.

* * * * *